Oct. 5, 1965  L. A. G. ROUJOB  3,209,521
APPARATUS FOR FILTERING DUST-LADEN GASES
Filed Jan. 6, 1959  5 Sheets-Sheet 3
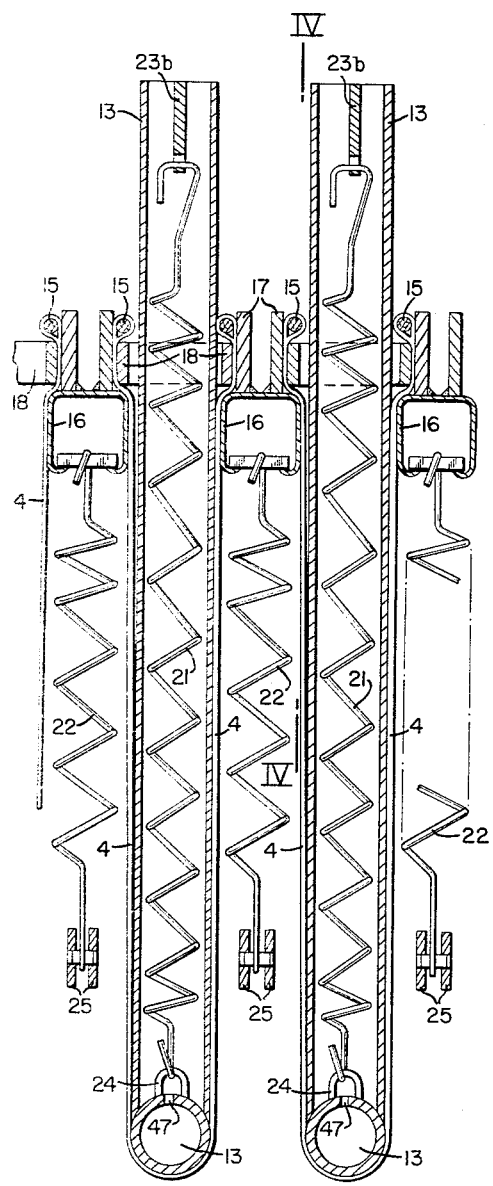
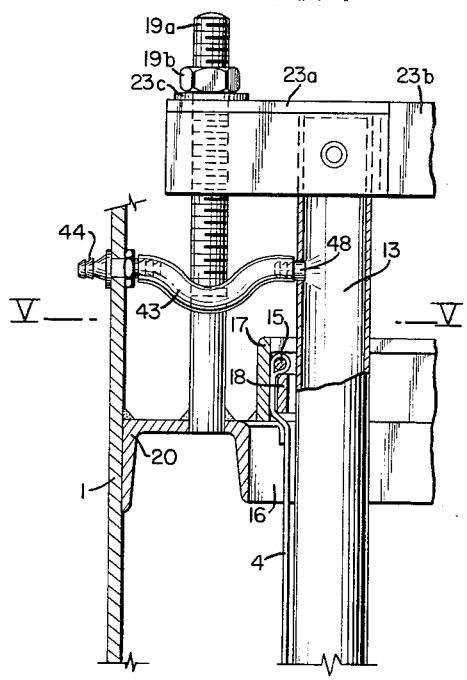
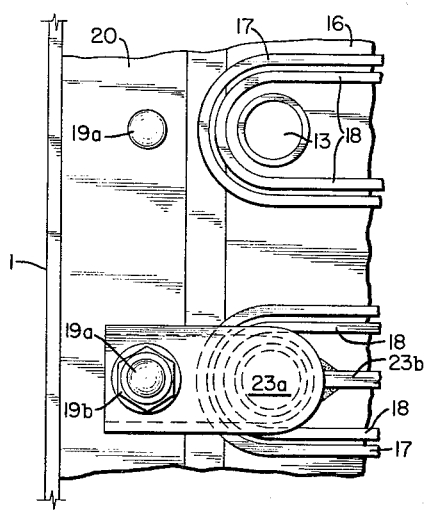
INVENTOR
LEOPOLD ANTOINE GUILLAUME ROUJOB
BY Benj. T. Rauber
ATTORNEY Oct. 5, 1965  L. A. G. ROUJOB  3,209,521
APPARATUS FOR FILTERING DUST-LADEN GASES
Filed Jan. 6, 1959  5 Sheets-Sheet 4
FIG.6
FIG.7
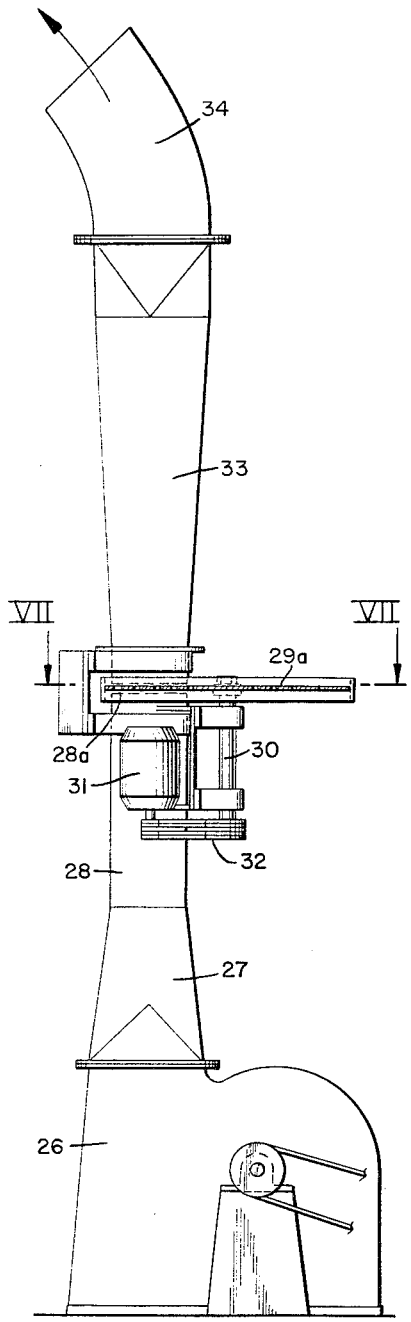
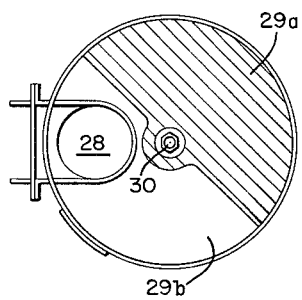
INVENTOR
LEOPOLD ANTOINE GUILLAUME ROUJOB
BY Benj J. Rauber
ATTORNEY

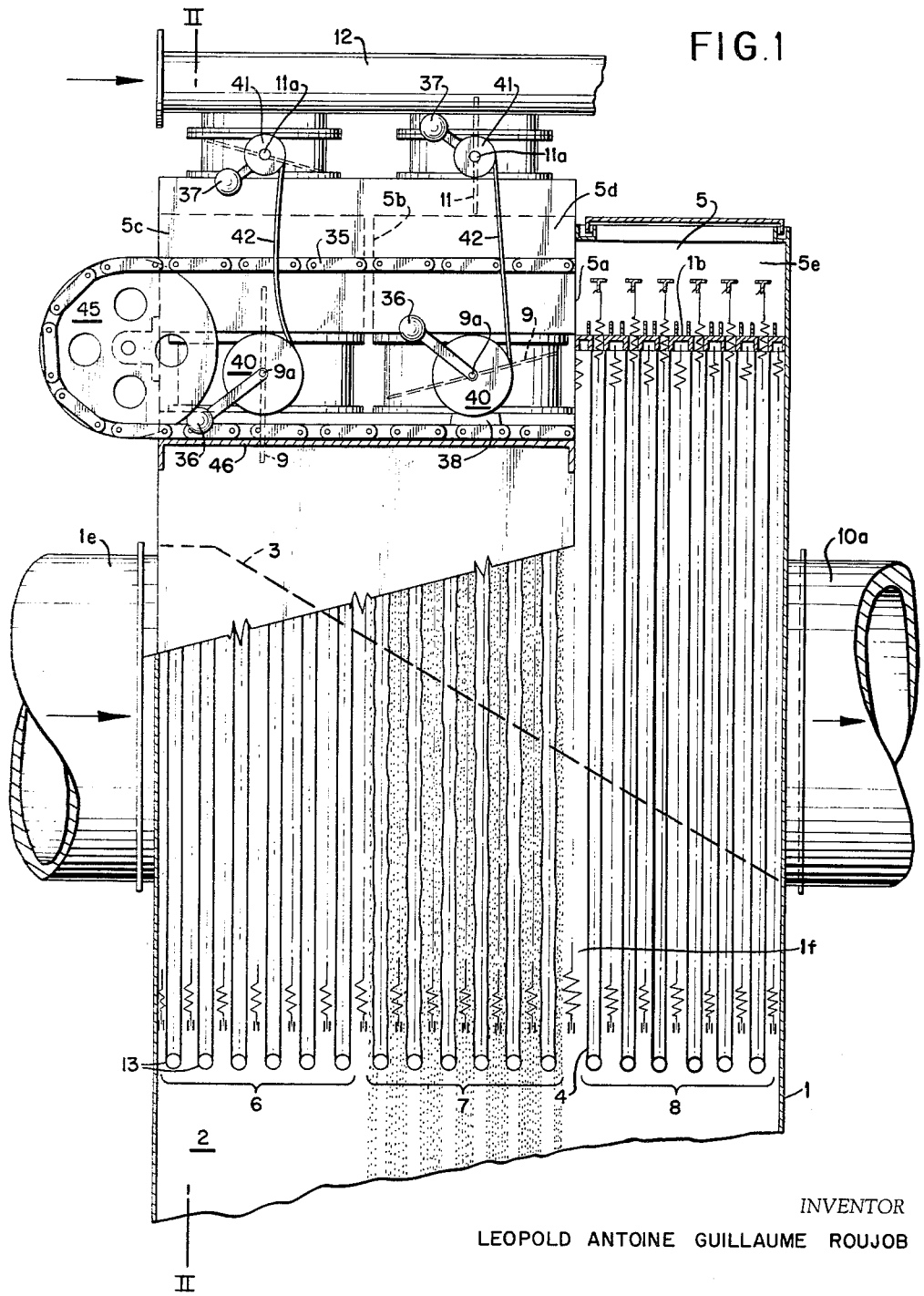

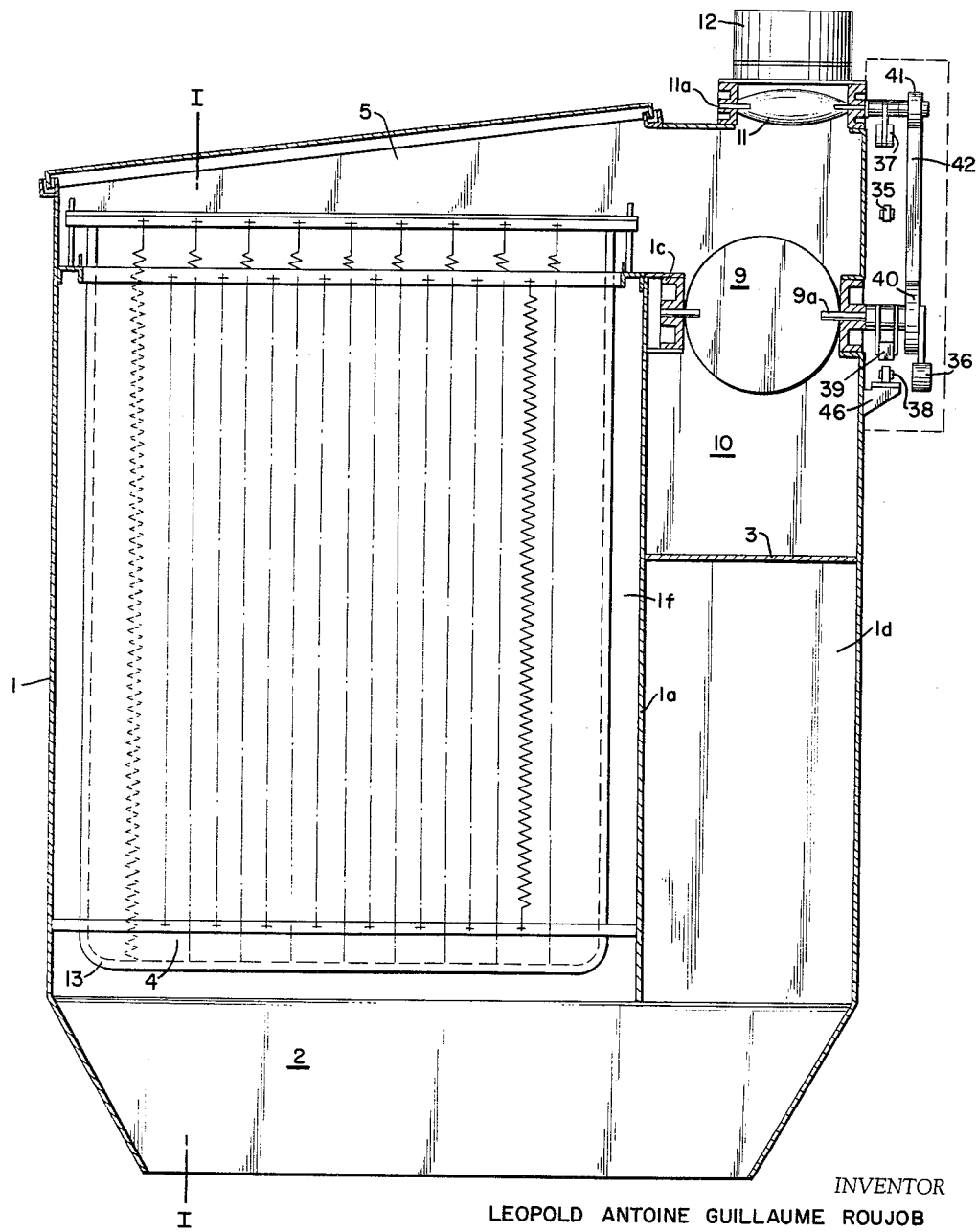

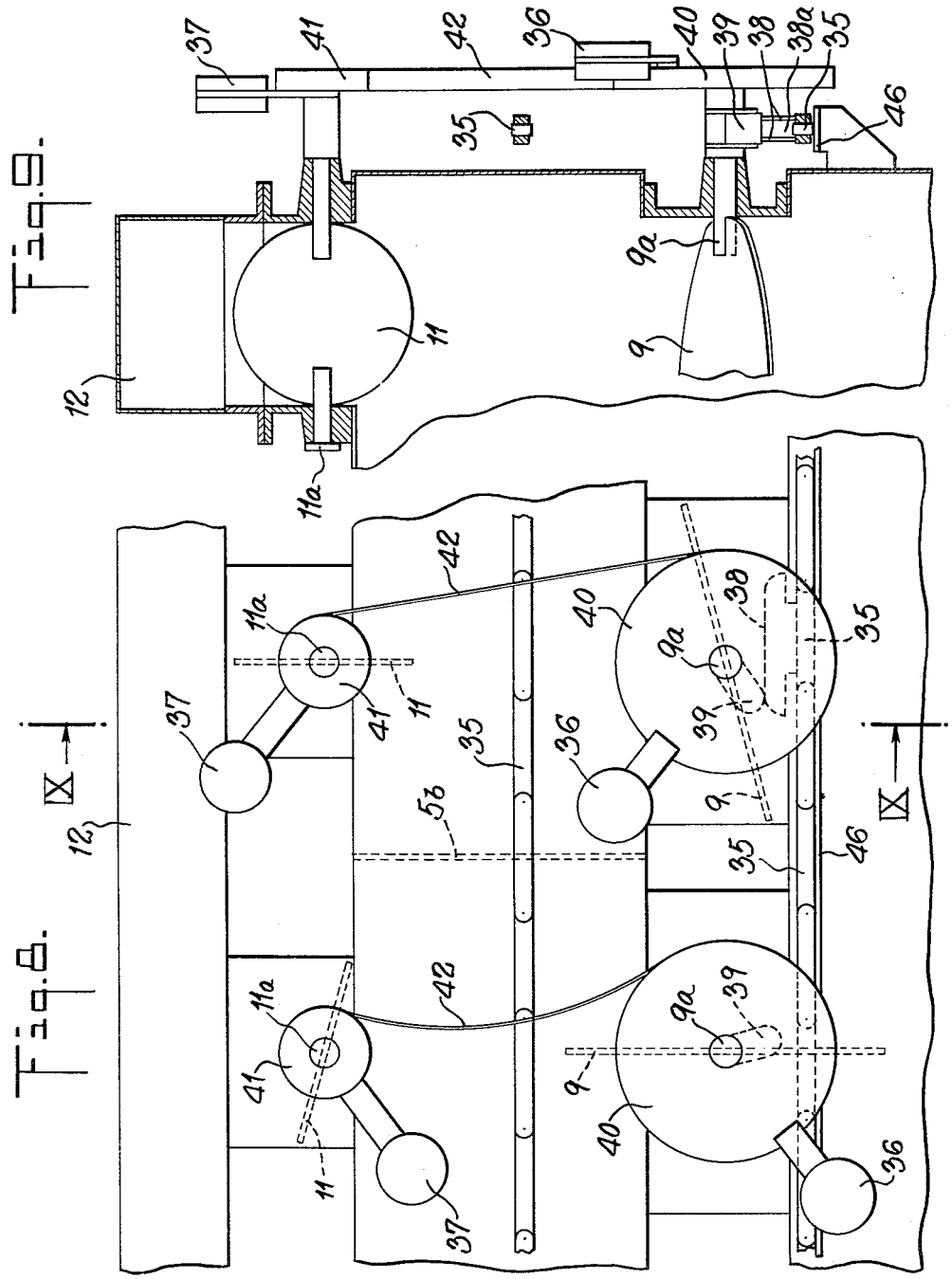

United States Patent Office 3,209,521
Patented Oct. 5, 1965

3,209,521
APPARATUS FOR FILTERING
DUST-LADEN GASES
Leopold Antoine Guillaume Roujob, Brussels, Belgium, assignor to Societe Belge Prat-Daniel, Societe Anonyme, Brussels, Belgium
Filed Jan. 6, 1959, Ser. No. 785,245
Claims priority, application Belgium, Jan. 8, 1958, 563,797
5 Claims. (Cl. 55—293)

It has long been known to filter dust-laden gases through a filter cloth.

The apparatus most commonly employed for this purpose comprise cylindrical filter bags disposed in housings. These bags are cleaned by passing air therethrough in counter-current to the normal direction of flow of the gas to be filtered and at the same time mechanically tapping the bags to facilitate detachment of the dust.

Such bag-type filters have the disadvantage that they are very voluminous and consequently very cumbersome, mainly because the gases circulate outside and inside the bags at a very low mean speed. Moreover, the effectiveness of cleaning by mechanical beating is relatively poor, is lacking in flexibility and in turn increases the complexity and overall dimensions of the apparatus, while being the cause of relatively rapid fatigue and tearing of the filter cloth.

Apparatus are also known which comprise filter bags mounted on stretcher frames, but these bags cannot be jolted unless the frames are jolted which further complicates the mechanical beating.

The present invention has for its object to provide an apparatus for filtering dust-laden gases which affords a considerable improvement and simplification in the cleaning and adjusting of the filter in the course of operation, while permitting of a considerable reduction in the volume of the filter for a given total filtering surface. The apparatus also enables reducing the wear of the filter cloth.

According to this invention the apparatus comprises the combination of filter elements comprising individually adjustable stretcher frames and spaced walls of suitable filter fabric taut thereon with a device for cleaning them by means of a pulsatory or vibratory air current flowing through the filter elements in counter-current to the normal direction of flow of the gases to be filtered, the power and the frequency of the vibratory air current being preferably regulable.

Preferably the filter elements are mounted on supports independent of the supports of the stretcher frames to tension the material of each element by relative displacement between the bag and the frame.

The filter elements are preferably of flat form (and advantageously rectangular) and their filtering walls are spaced apart and disposed side-by-side to permit the walls to vibrate transversely to their plane by the action of the pulsations of the current of cleaning air.

Spaced members of appropriate form, for example in the form of coil springs of wide pitch, may be disposed inside and/or outside the filter elements to support the filtering fabric at spots spaced throughout the area of the wall while allowing the air pulsations to act freely on the said walls, and enabling the latter to vibrate freely in the area between said spaced spots without touching one another, under a regulable tension of the filtering walls, said tension being regulable according to the chosen frequency and power of the vibrations of pulses of the cleaning air current.

A current of pulsatory air of regulable appropriate power and high frequency is produced by means of a shut-off member having an intermittent regulable action of high frequency on a high-speed gas current produced, for example, in the neck of a Venturi tube fed with an adjustable air supply and connected to the filter bags on the downstream side of the latter (direction of the flow of the gases to be filtered).

The filter bags may be divided into groups, the downstream side of each group being connected to a housing adapted to be placed in communication, on the one hand, with a pulsatory air current generator, and on the other hand with a discharge duct for the filtered gases, through respective valve members having opposite alternate actions, the shut-off members of the various groups being adapted to be actuated successively and automatically.

The stretcher frames may be so constructed as to serve simultaneously for indicating the pressure existing at the base of the filter bags and consequently for the detection of any breaks or tears in the latter.

The invention ensures much more effective and supple filtration of the dust-laden gas and cleaning of the filtering walls, such filtration and cleaning being more readily effected than filtration with cleaning by simple counter-current air flow. Also the cleaning action exerts much less fatigue on the filter cloth than cleaning by mechanical jolting.

It is obvious that, in order to free a cloth from the dust by which it is impregnated, it is preferable to jolt the cloth laterally in relation to its surface, as in the present invention, rather than to exert longitudinal pulls in relation to the surface.

A filtering apparatus according to the invention will now be described by reference to the accompanying drawings, which show diagrammatically a preferred embodiment of my invention:

FIG. 1 is a vertical elevation partly in section of filter apparatus according to my invention, the section part being taken on line I—I of FIG. 2;

FIG. 2 is a vertical section of the apparatus of FIG. 1 taken on line II—II;

FIGURE 3, a transverse section, to a larger size, through various filter elements, their stretcher frames and the respective supports and also shows certain spaced members;

FIGURE 4, a section on the line IV—IV of FIGURE 3;

FIGURE 5, a section on the line V—V of FIGURE 4;

FIGURE 6 is a side view of a device for generating a pulsatory current of air; and FIGURE 7, a section on the line VII—VII of FIGURE 6;

FIG. 8 is a diagrammatic side elevation taken in the same direction as that of FIG. 1 but on an enlarged scale of a detail of the damper actuating mechanism;

FIG. 9 is a cross-sectional elevation taken on line IX—IX of FIG. 8.

In the example illustrated in FIGURES 1 and 2, the filtering apparatus comprises a housing 1 subdivided by partitions 1a, 3, 1b and 1c into five chambers, namely:

(a) an admission chamber 1d, FIG. 2, connected to the admission duct 1e, FIG. 1, for the dust-laden gases to be filtered, (b) a chamber 1f containing a series of filter elements 4, divided into three groups 6, 7, 8, the said chamber 1f communicating with the admission chamber 1d through the chamber 2 for the collection and discharge of the dust. The chamber 2 may be, for example, in the form of a closed hopper.

(c) a chamber 5 for collecting the filtered gases, and (d) a chamber 10 for the discharge of the filtered gases, which is connected to the discharge duct 10a, the collecting chamber 5 being in turn subdivided by vertical partitions 5a, 5b into three compartments 5c, 5d, 5e communicating respectively with the interior of the groups 6, 7, 8 of filtering elements 4. In addition, each of the compartments 5c, 5d, 5e, for the collection of filtered gas communicates, on the other hand with the discharge chamber 10 through a valve 9, and, on the other hand, with an admission duct 12 (for pulsatory air) through a valve 11, the valves 9 and 11 being conveniently manipulable, preferably one in dependence upon the other, by a device which will hereinafter be described.

FIGURES 3, 4 and 5 show details of the filter elements and of the stretcher frames.

The filter elements 4, of rectangular form are provided at their mouths with a cord 15 sewn into the said edges so as to form a hem. The filter elements 4, are suspended from supports consisting of members 16, 17 (FIGS. 3 and 4) fixed to the housing 1 by means of inverted channels 20, the elements 4, being clamped to members 16, 17 by means of flat frames 18 lying between the members 16 and the cord 15 of the respective bags, so that the mouths of the latter are held between the elements 16, 17 and 18.

The stretcher frames each consist of a U-shaped tube 13 disposed within the corresponding filter element 4 so as to be supported thereby.

It is important that the filter cloth of each element should be separately stretched to an individually adjustable extent. This is effected by combining each stretcher frame 13 with a tensioning device (see FIGURES 4 and 5) comprising a cross-member 23a, 23b fixed to the free upper ends of the frame and formed at each of its ends with a hole 23c through which there passes a screwthreaded rod 19a fixed to the channel 20 and having mounted thereon at least one nut 19b, by means of which an adjustable pressure can be exerted on the cross-member 23a, 23b, 23c, so as to tension the filter element 4 by downward pressure of frame 13. There may obviously be mounted on the rod 19a below the cross-member 23a, 23b, 23c another nut (not shown) to limit the downward movement of the stretcher frame 13.

Contact between the adjacent filtering surfaces of the elements 4 is prevented by disposing between the said surfaces spacer members advantageously in the form of coil springs 21 and 22 of wide pitch. The springs 21 which are within the filter elements 4 are fixed at their upper end to the portion 23b of the cross-member 23a, 23b of the stretcher frame, and at their lower end to eyes 24 fixed to the cross limb of the frame 13.

The springs 22 which are between the elements 4 are fixed at their upper end to the members 16 and at their lower end to separate cross members 25 fast with the housing 1.

The device for the generation of a plusatory current of air, which is illustrated in FIGURES 6 and 7, comprises a fan 26, of which the delivery side is connected to the convergent duct of a Venturi tube 27, 28 which is connected at its divergent portion 33 to the duct 34 leading to the duct 12 of the filtering apparatus (FIGS. 1 and 2). The neck of the Venturi tube is formed with a transverse slot 28a, through which passes a disc 29a which is cutaway at 29b, the disc being mounted on a rotary shaft 30 driven by a motor 31 through a transmission system 32. Both the motor driving the fan and the motor 31 driving the disc 29a advantageously have speed-adjusting means of any appropriate known type (not shown). It would also be possible to employ a variable-speed transmission system instead of the transmission system 32.

The device for controlling the opening and closing of the valves 9 and 11 as illustrated by way of example in FIGURES 1 and 2 is arranged as follows:

The pivot pin 9a of each valve 9 carries a counterweight 36 which normally maintains the corresponding valve 9 in the open position, while the pivot pin 11a of each valve 11 carries a counterweight 37 which normally maintains the corresponding valve 11 in the closed position. In addition, the pivot pins 9a and 11a carry a pulley 40, 41 respectively, the pulleys 40 and 41 being connected together by a belt 42 fixed at its ends and passed around the pulleys in such manner that when the valve 9 is opened against the action of its counterweight 36 the belt 42 is wound onto the corresponding pulley 40 and unwound from the pulley 41 of the corresponding valve 11, thus opening the latter against the action of its counterweight 37.

Each of the pivot pins 9a of the valves 9 is provided with a lever 39, the said levers co-operating with one or more shoes, inclined surfaces or cams 38, the length of which is preferably adjustable, and which are secured, desirably in adjustable fashion, to an endless chain 35 which passes around pulleys 45 which are slowly rotated, preferably at an adjustable speed, by any appropriate driving means (not shown). The lower run of the chain 35 passes over a bracket or support 46.

During operation, the said driving device causes the shoe 38 to pass slowly and successively under the levers 39 of the successive valves 9, thus successively closing and opening them, while at the same time opening and closing the corresponding successive valves 11 and thus effecting the successive cleaning of each of the filter groups 6, 7, 8 during the operation of the other groups.

Although in the filter according to the invention, which cleans by means of a pulsatory air current, the filter cloths are subjected to much less fatigue than in the known filters operating with mechanical jolting, it will sometimes happen that one or more filter elements become torn in time and allow dust to escape.

The following device permits of detecting any defective filter elements from outside the filtering apparatus, while the latter is in operation (see FIGURES 3 and 4). The U-shaped tube forming each stretcher frame 13 is closed at its upper ends and formed at its lower end with at least one hole 47 (FIG. 3) leading into the interior of the corresponding filter bag 4, the said hole or holes serving as a static pressure tap for the gas in the lower part of the bag. Another portion of each stretcher frame 13, for example one of its free ends, is provided with nozzles 48 (FIG. 4) connected by a flexible pipe 43 to a nipple 44 fixed to the wall 1 of the housing and connected in turn to a manometer (not shown). Thus, if the filter bag becomes torn the gas pressure at the bottom of the bag will increase, and this pressure increase will be transmitted to the outside and will be indicated on the manometer during the operation of the apparatus.

The operation of the filtering apparatus is as follows: the speeds of the fan 26 and of the shut-off disc 29 being adjusted to the most effective frequency of vibration for the elements 4, the frequency of which in turn is fixed by adjustment of the stretching devices 19a, 19b, 23a, 23b, 23c, 13, the gas to be filtered, which is admitted through duct 1e, is uniformly distributed in the chamber 2 owing to the obliquity of the partition 3 (see FIG. 1) and flows from the said chamber through the filter elements of groups 6 and 8 (FIGURE 1), in which it leaves the dust, into the collecting compartments 5c and 5e and from the latter through the open valves 9 (for the groups 6 and 8) into the discharge chamber, from which they escape through the duct 10a.

With regard to group 7 of the filter elements 4, it will be seen from FIGURE 1 that the shoe 38 passes exactly under its group of valves 9, 11 and thus maintains the valve 9 in the closed position and the valve 11 in the open position. Consequently, the pulsatory air current coming from duct 12 acts through the filter elements 4 of the group 7 in counter-current to the direction of the gases to be filtered (which come from 2) and thus produces a vigorous and extremely effective cleaning of the filters 4 of the group 7. As soon as the shoe 38 passes from the group of valves 9, 11 corresponding to the group 7 of filter elements to the next succeeding valves 9, 11 for example to that corresponding to group 6, the latter group is then cleaned by the pulsatory air current, while the group 7 is used for filtering in normal manner. The dust freed from the filter elements during cleaning falls into the hopper 2 and can be discharged therefrom.

The disc 29a may be replaced by a circular apertured disc.

I claim:

1. Apparatus for filtering suspended particles from gases which comprises at least one filter element, said element comprising a container having a pair of spaced walls of filtering fabric and an opening at one end, a U-shaped tube disposed in said container with its transverse part bearing against the end of said container opposite said open end to hold said spaced walls taut, a support independent of the container supporting the two branches of said U-shaped tube adjustably for adjustment towards or away from the support to adjust the tautness of said spaced walls, means to support said spaced walls at spots spaced throughout the area of said walls against movement transverse to the planes of said walls at said spots and to permit said walls to vibrate in the spaces between said spots, and means to draw gases through the walls of said container and through said opening and to admit vibrative pulses of gas under pressure through said opening to vibrate the flat walls of said container between said spots.

2. Apparatus according to claim 1 in which each frame incorporates a device for the detection of breaks in the container, said device comprising one or more apertures in the transverse branch and a nozzle adapted to connect the interior of the tube, near one of its free ends, to a manometer situated outside the apparatus.

3. Apparatus for filtering suspended particles from gases which comprises a housing, a partition dividing said housing into an upper off-take chamber and a lower intake and particle collecting chamber, said partition having spaced, parallel, elongated openings, elements comprising narrow containers having walls of filtering fabric, one element for each opening secured to the edges of said openings and depending into said lower chamber element and opening upwardly into said off-take chamber, a frame in each of said elements to hold the side walls taut and spaced from each other, a series of helices of rigid material spaced at intervals in each element with their axes parallel to the walls of said container to contact said walls at spaced spots, a second series of helices between said elements with their axes parallel to the walls of said container to contact the sides of said elements at spaced spots, said off-take chamber having an opening for cleaned gases, a device for generating a pulsatory air current having a connection to said off-take chamber and a system of valves for controlling the escape of dust-free gases from the off-take chamber and the admission of said pulsatory air current into said chamber.

4. The apparatus of claim 3 in which said system of valves for controlling the escape of dust-free gases from the off-take chamber and the admission of said pulsatory gas current to said chamber comprises a valve in said opening of said off-take chamber, a valve in the connection of said device for generating said pulsatory current to said off-take chamber and mechanism alternatively to close one of said valves and simultaneously to open the other.

5. Apparatus according to claim 4 in which the elements are divided into groups and each group of elements is connected to a separate discharge chamber for dust-free gases, each of said separate discharge chambers having a separate closable admission chamber for the pulsatory air current and a separate closable outlet chamber for the dust-free gases, a valve system for the admission of the pulsatory air current and for the discharge of the gases freed from dust being provided for each group of elements.

References Cited by the Examiner

UNITED STATES PATENTS

| Re. 24,521 | 8/58 | Young. |
|---|---|---|
| 1,316,883 | 9/19 | Fatscher. |
| 1,324,635 | 9/19 | Ascoli. |
| 1,341,129 | 5/20 | Hopkins. |
| 1,349,480 | 8/20 | Wilsmore. |
| 1,784,339 | 12/30 | Clasen. |
| 2,215,282 | 9/40 | Williams. |
| 2,507,335 | 5/50 | Donohue. |
| 2,641,364 | 6/53 | Depallens. |
| 2,765,047 | 10/56 | Hershey. |
| 2,867,289 | 1/59 | Sare. |

FOREIGN PATENTS

| 695,574 | 8/40 | Germany. |
|---|---|---|
| 827,314 | 1/52 | Germany. |
| 598,428 | 2/48 | Great Britain. |
| 616,891 | 1949 | Great Britain. |

HARRY B. THORNTON, *Primary Examiner.*

WALTER BERLOWITZ, WESLEY S. COLE, *Examiners.*